Feb. 20, 1951 R. E. HERRSTRUM 2,542,519
TABLE CONTROL FOR HYDRAULIC MACHINE TOOLS
Filed May 15, 1947 5 Sheets-Sheet 1

INVENTOR.
Rudolph E. Herrstrum
BY Christian, Schroeder,
Merriam & Hogreen
his Attorneys.

Feb. 20, 1951 — R. E. HERRSTRUM — 2,542,519
TABLE CONTROL FOR HYDRAULIC MACHINE TOOLS
Filed May 15, 1947 — 5 Sheets-Sheet 2

INVENTOR.
Rudolph E. Herrstrum
BY
his Attorneys.

Feb. 20, 1951 R. E. HERRSTRUM 2,542,519
TABLE CONTROL FOR HYDRAULIC MACHINE TOOLS
Filed May 15, 1947 5 Sheets-Sheet 3

INVENTOR.
Rudolph E. Herrstrum
BY
his Attorneys.

Feb. 20, 1951 R. E. HERRSTRUM 2,542,519
TABLE CONTROL FOR HYDRAULIC MACHINE TOOLS
Filed May 15, 1947 5 Sheets-Sheet 4
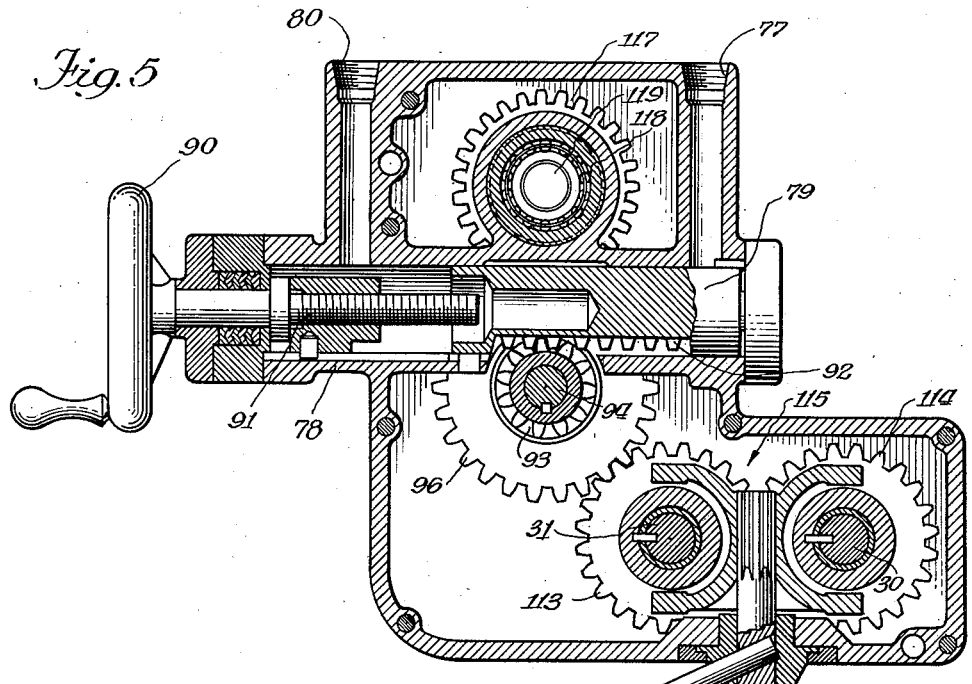
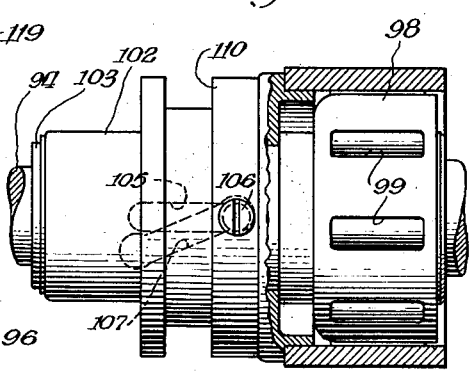
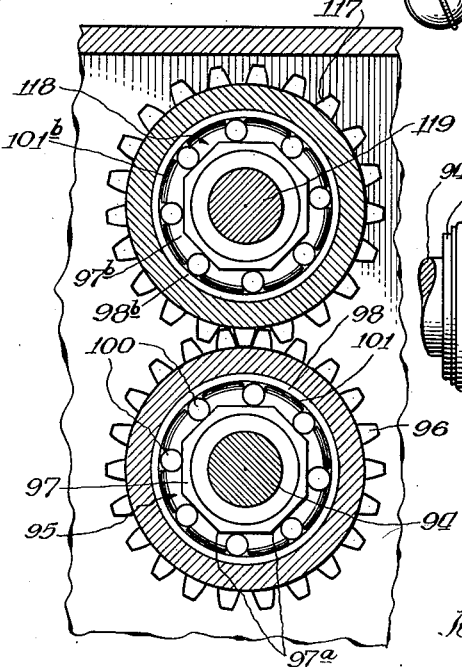
INVENTOR.
Rudolph E. Herrstrum
BY
Chritton, Schroeder, Merriam & Hofgren
his Attorneys.

Feb. 20, 1951  R. E. HERRSTRUM  2,542,519
TABLE CONTROL FOR HYDRAULIC MACHINE TOOLS
Filed May 15, 1947  5 Sheets-Sheet 5
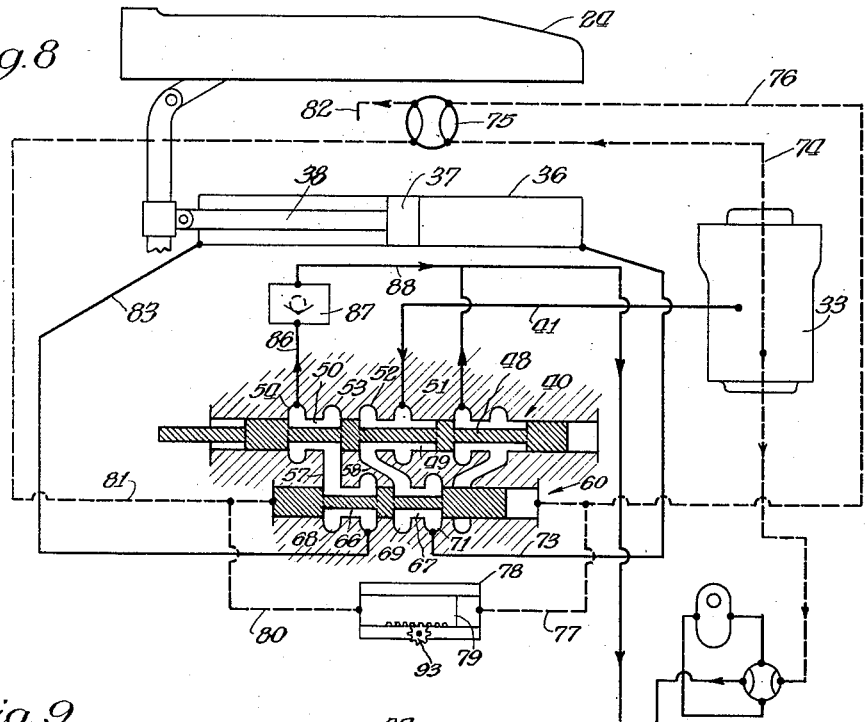
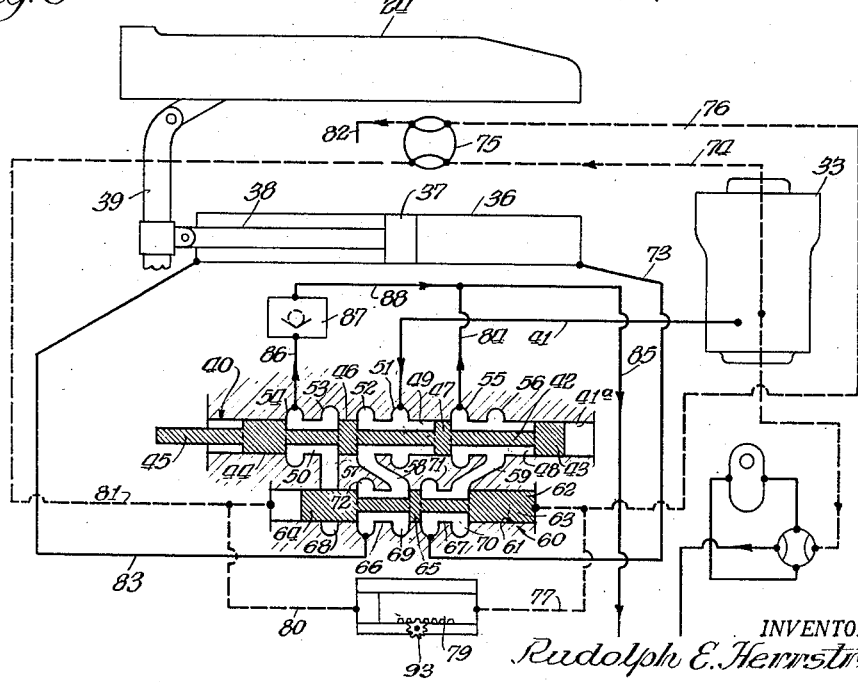
INVENTOR.
Rudolph E. Herrstrum
BY
Chritton, Schroeder, *herrian & form*
his Attorneys.

Patented Feb. 20, 1951

2,542,519

UNITED STATES PATENT OFFICE 2,542,519

TABLE CONTROL FOR HYDRAULIC MACHINE TOOLS

Rudolph E. Herrstrum, Rockford, Ill., assignor to Rockford Machine Tool Company, Rockford, Ill., a corporation of Illinois Application May 15, 1947, Serial No. 748,253

8 Claims. (Cl. 90—38)

This invention relates to machine tools, and more particularly to a hydraulically driven machine tool of the shaper or planer type.

It is an object of this invention to provide new and novel feed means in a machine tool of the class described for imparting traverse or vertical movement to the work carrying table, the means being synchronized with the reciprocation of the cutting member.

It is a further object of the invention to provide, in a machine tool of the shaper type, means for effecting a rapid traverse or vertical movement of the work table in a simple and expedient manner.

A further object of the invention is to provide the table of a shaper with feed means including overrunning clutch devices in order that rapid traverse or vertical movement may be had without disengaging the synchronized feed movement.

A further object of the invention is to incorporate the control of the traverse or vertical feed and the rapid traverse or vertical motion into a single manually actuable lever.

Other and further objects of the invention will be apparent from the following description and drawings in which:

Fig. 5 is a vertical section of the cross rail assembly along lines 5—5 of Fig. 3;

Fig. 6 is a section along lines 6—6 of Fig. 3;

Fig. 7 is an enlarged detailed view of a portion of the overrunning clutch assembly; and Figs. 8 and 9 are diagrammatic views of the hydraulic circuit.

Figure 1:
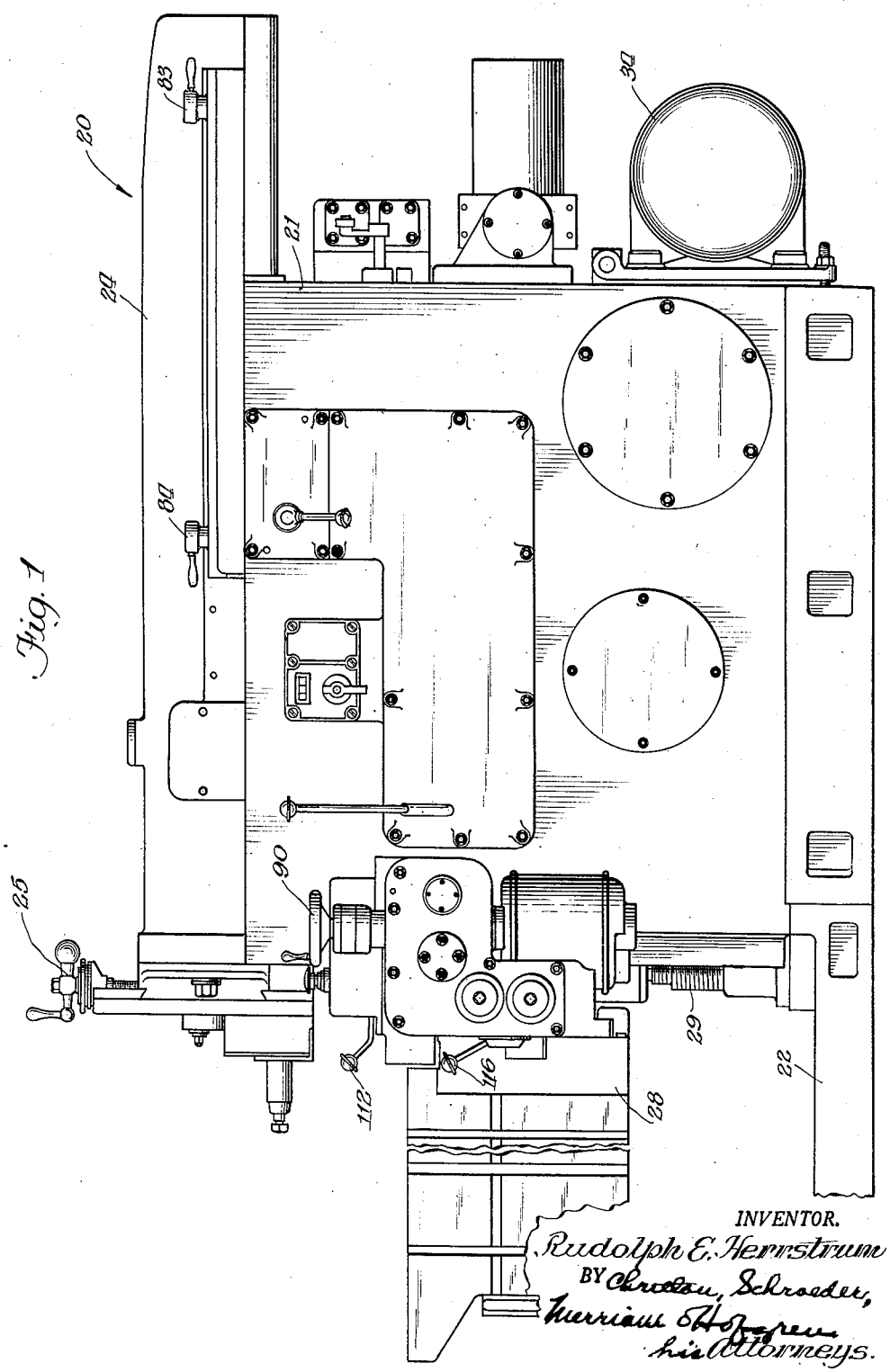
Fig. 1 is a side elevation of a shaper embodying the invention.

While my invention is susceptible of embodiment in many different forms, I have shown in the drawings and will herein describe in detail one such embodiment, with the understanding that the present disclosure is to be considered as an exemplification of the principles of the invention to the embodiment illustrated. The scope of the invention will be pointed out in the appended claims.

Figure 2:
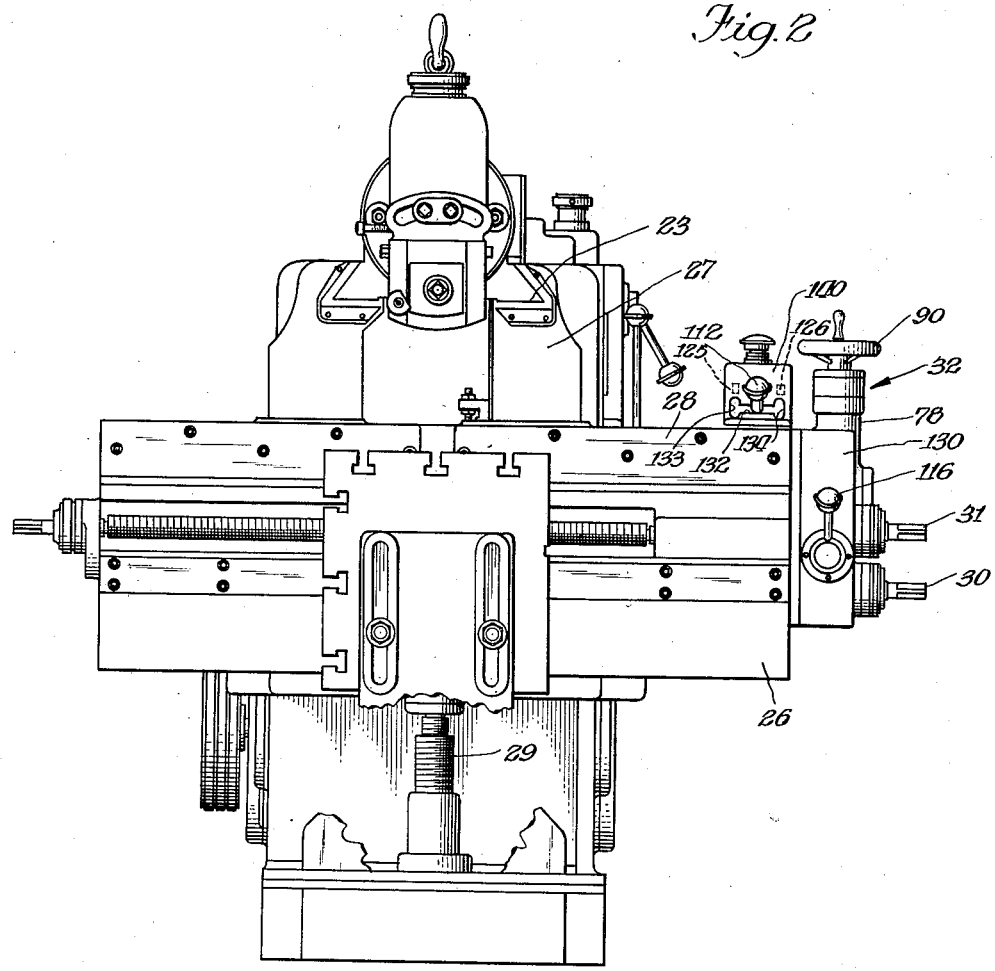
Fig. 2 is a front elevation of the machine shown in Fig. 1.
Figure 3:
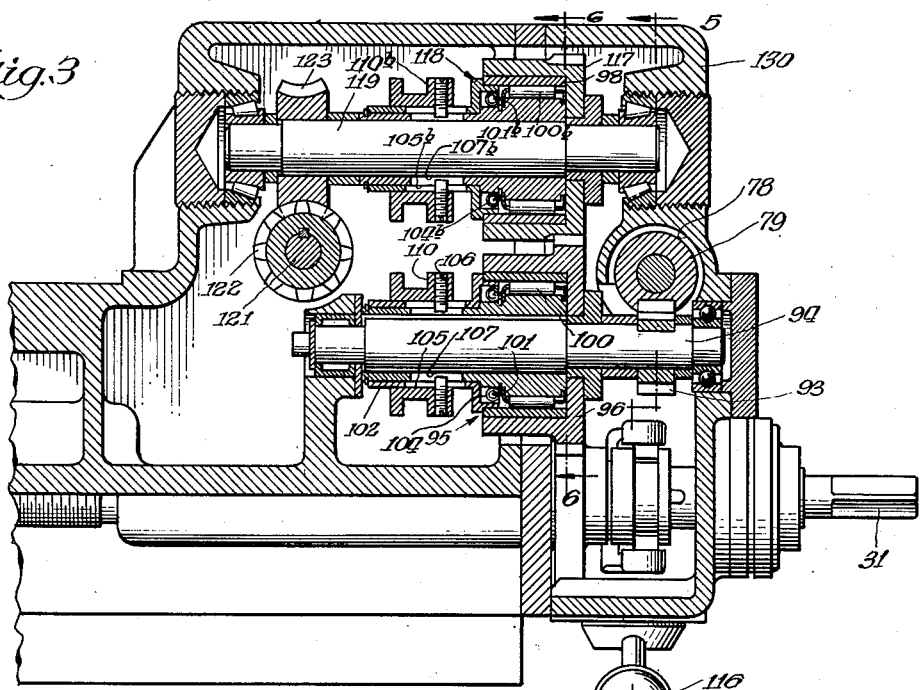
Fig. 3 is a horizontal section of a portion of the cross rail assembly.

For purposes of disclosure the invention, while relating generally to hydraulic machine tools having a first reciprocable carriage and a second carriage intermittently fed across the path of the first carriage and in timed relationship with the reciprocations thereof, one of the carriages supporting a tool and the other a work piece, is here shown and will be described hereinafter as embodied in a shaper. As shown in Figs. 1 and 2, such a shaper 20 has a column 21 resting upon an elongated base 22. Reciprocable longitudinally of the base in ways 23 formed on the top of the column is a tool carrying member or ram 24 equipped at its forward end with conventional mechanism 25 for adjustably supporting a tool. The ram 24 has a forward cutting or feed stroke and a rearward or return stroke, and is reciprocated by a hydraulic motor, which motor and hydraulic circuit will be hereinafter more fully described. Located at the front of the machine is the work supporting unit or table comprising a rail 26 mounted for vertical sliding movement on ways 27 formed on the front face of the column 21, and a table 28 supported on the rail 26 for movement traversely of the base and of the path of reciprocation of the ram 24. The rail 26 is adjusted vertically to position the work with respect to the tool by means of the well known telescoping screw and nut arrangement 29 which may be actuated by manual rotation of a shaft 30 having a lead screw portion projecting from the right hand end of the rail. Movement of the table 28 in either direction traversely of the path of reciprocation of the ram 24 may be imparted manually by rotation of a shaft 31 similarly provided with a lead screw portion. Both vertical and traverse movement of the table may be imparted automatically in timed relation with reciprocation of the ram by a hydraulic motor generally designated 32.

Operating fluid, oil being commonly employed, is supplied to the various motors by a pump 33 of the constant displacement type, located within the column 21 and driven at a constant speed by an electric motor 34 mounted in the rear of the bed. The pump is a double pump, that is, comprises two constant displacement pumps built together, the larger for driving the ram, and the smaller for pilot and feed adjustment. The pumps drive fluid from a reservoir from the bottom of the column (not shown) and discharge the fluid into a main actuating circuit and into the auxiliary circuits. The fluid in the circuits is controlled to obtain the movements of the various parts described above by manually and automatically operable valves by means of which the shaper may be started manually after which the ram will be continuously reciprocated at selected feed rates, and the work table will be fed traversely or vertically intermittently in time relation with the reciprocation of the ram, with the operation of the shaper continuing in this manner until manually arrested.

The hydraulic circuit is diagrammatically illustrated in Figs. 8 and 9 and includes a hydraulic motor 36 having a piston 37 reciprocable therein, the piston being connected by rod 38 and torque arm 39 for reciprocation of the ram 24, the torque arm 39 being more fully described and claimed in my copending application filed May 15, 1947, as Serial No. 748,252, and now Patent No. 2,512,019, granted June 20, 1950.

Hydraulic fluid under pressure is delivered from the pump 33 to a stop and go valve 40 by means of a conduit 41. The stop and go valve comprises a bore 41a having a valve 42 slidable therein. The valve is provided with two end portions 43 and 44, the valve stem protruding from the left hand end of the bore to provide the portion 45 for manually setting the valve 40. Two spaced lands 46 and 47 are provided intermediate the ends of the valve defining reduced portions 48, 49 and 50 therebetween. The previously mentioned conduit 41 connects with the interior of the valve by means of an annular groove 51. Three additional annular grooves 52, 53 and 54 are provided to the left of the groove 51 while two other annular grooves 55 and 56 are to the right of the groove 51. Annular grooves 53, 52 and 56 connect by means of passages 57, 58 and 59 with a four-way valve 60.

The four-way valve 60 includes a bore 61 having a valve 62 slidable therein, the valve having two end portions 63 and 64 and a single land 65 intermediate the ends defining the reduced portions 66 and 67 therebetween. Annular groove 68 connects with the passage 57 while annular grooves 69 and 70 connect with the passages 58 and 59, respectively. Two additional annular grooves 71 and 72 are also provided in the bore.

With the stop and go valve 40 in the position shown in Fig. 8, fluid under pressure from the pump 33 is directed by means of conduit 41 to the annular groove 51, reduced portion 49, annular groove 52, passage 58, annular groove 69, reduced portion 67 and the annular groove 71 to a conduit 73 and thence to the right hand end of the cylinder 36 to reciprocate the piston to the left, as viewed in that figure. Hydraulic fluid under pressure is also delivered by the pump through a conduit 74 to pilot valve 75 and thence via conduit 76 to the right hand end of the four-way valve 60 to move it to the position shown in Figure 8. Fluid under pressure is also directed from the conduit 76 into the conduit 77 and into the right hand end of the feed cylinder 78 to move a piston 79 therein to the left, as shown. Hydraulic fluid in the left hand ends of the feed cylinder 78 and the four-way valve 60 are returned by conduits 80 and 81 to the pilot valve and thence by conduit 82 to the sump. Fluid is returned from the left hand end of the cylinder 36 through the conduit 83, annular groove 72, reduced portion 66, annular groove 68, passage 57, annular groove 53, reduced portion 50, annular groove 54 and conduit 86 to a back pressure valve 87. The back pressure valve is designed to maintain a predetermined amount of back pressure in the system to insure smooth operation of the ram. Fluid then passes through conduit 88 to the sump.

When the ram 24 is moved to the left the desired stroke, the pilot valve 75 is rotated approximately 90° by the reversing dogs 83 and 84 provided on the ram. Rotation of the pilot valve moves it to the position shown in Fig. 9. Control fluid from the pump 33 will then flow through conduit 74, pilot valve 75 into the conduits 81 and 80 to reciprocate the piston 79 in the feed cylinder and also to move the four-way valve to the right to the position shown in Fig. 9. Hydraulic fluid from the right hand end of the four-way valve and from the feed cylinder is returned by conduits 76 and 82 to the sump.

With the four-way valve in the position shown in Fig. 9, operating hydraulic fluid from the pump passes through conduit 41, stop and go valve 40, and thence is directed via the reduced portion 66 and annular groove 72 to a conduit 83 into the left hand end of the cylinder 36 to reciprocate the piston thereto to the right. Fluid from the right hand end of the cylinder 36 is returned through conduit 73, annular groove 71, reduced portion 67, annular groove 70, passage 59, reduced portion 48, annular groove 55, conduits 84 and 85 to the sump.

It can be seen from the foregoing that the direction of reciprocation of the feed piston 79 is reversed along with the reversal of direction of travel of the ram 24 and in timed relationship therewith.

Referring now to Figs. 3 to 7, inclusive, the piston 79 reciprocates within the cylinder 78 and the amount of such reciprocation can be predetermined by adjustment of the hand wheel 90 connected with the threaded shaft 91 which protrudes into the end of the cylinder 78. The piston 79 is provided with a toothed rack 92 adapted to mesh with the teeth of a pinion 93 keyed to a shaft 94. The shaft is rotatably mounted within the housing 130 provided on the cross rail and is, of course, rotated to the left and right with the reciprocation of the piston 79. Attached to the shaft 94 is an overrunning clutch generally indicated at 95 to which is attached a first gear 96. While the shaft 94 rotates in two directions with the reciprocation of the piston 79, the overrunning clutch member 95 is so designed as to impart a unidirectional rotation to the gear 96, the direction of which rotation may be predetermined. The clutch also permits the gear to rotate in the selected direction at a faster rate than the rotation of the shaft 94.

As is more clearly shown in Figs. 6 and 7, the overrunning clutch 95 comprises an octagonal fitting 97 attached to the shaft 94. Surrounding the fitting is a collar 98 having a plurality of bearing engaging means provided about its periphery, the bearing engaging means comprising, in the embodiment shown, elongated slots 99. A plurality of roller bearings 100 are held in a cage 101 which is resiliently secured to the collar 98 by means of a spring 104. The collar 98 is provided with a projection 102 which is frictionally fitted on a tubular member 103 which is secured to the shaft 94. The position of the bearings 100 relative to the edges 97a of the hexagonal portion is determined by the position of the cage 101, which may be rotatably adjusted as will be fully described hereafter.

With the cage 101 in the position shown in the overrunning clutch 95 in the lower portion of Fig. 6, it can be seen that rotation of the shaft 94 and hence the fitting 97 in a counterclockwise direction wedges the bearings 100 against the edges 97a and the portions 99 of the collar, thereby to carry the collar and hence the gear 96 in a similar counterclockwise rotation. If, however, force is applied to the gear to rotate it at a faster rate than the shaft 94, the spring 104 between the collar 98 and the cage 101 permits the bearings 100 to be drawn forward with respect to the octagonal fitting 97 so as to relieve the wedging action and permit the bearing engaging slots 99 to ride over the bearings. Likewise, rotation of the shaft 94 in a clockwise direction would impart no movement to the gear 96.

A rotation of the cage in a clockwise direction to the position of the cage in the overrunning clutch 118 shown in the upper portion of Fig. 6, sets up a reverse relationship between rotation of the gear and shaft, and in such position, clockwise rotation of the shaft is transmitted to the gear to cause its rotation in the same direction. Clutch 118 is of the same construction as clutch 95 and like parts have like numerals with the letter b added.

As previously described, the projection 102 has a frictional fit on the tubular member 103. An annularly grooved shifter collar 110 is slidably mounted on the projection 102 and is traversed by a pin 106 which likewise extends through a longitudinal slot 105 in the projection 102 and a diagonal slot 107 in the tubular member 103. Sliding the shifter collar 110 longitudinally of the shaft causes the pin 106 to engage the sides of the slots 105 and 107 and thereby rotate the projection 102 about the tube 103 so as to move the cage 101b from the position shown in the upper portion of Fig. 6 to a reverse position (similar to that shown in the lower portion of Fig. 6 for cage 101) thus reversing the driving direction of the clutch.

In the machine tool shown the reversal of both clutches is simultaneously effected by means of a lever 141 secured to a rod 111 which is pivotally mounted in the housing 140 and which may be pivoted by moving a hand lever 112, the lever 141 being provided at its ends with shifters 108 and 109 which engage the annular grooves in the collars 110 and 110b of the overrunning clutches 95 and 118 respectively. Pivoting the lever 141 by use of the hand lever 112 moves the two collars simultaneously in opposite directions to reverse both clutches.

The gear 96 is in mesh with a second gear 113 mounted upon the shaft 31. The gear 113 is in turn in mesh with a third gear 114 mounted upon the shaft 30. Both gears 113 and 114 are mounted for free rotation upon their respective shafts so as to be free to rotate without imparting that rotation to the shafts. Clutch means generally designated 115 is provided to clutch either of those gears to their respective shafts in order that rotation of the clutched gear will cause rotation of the shaft. A handle 116 is provided for the actuation of the clutch means. The gear 96 is also in mesh with a fourth gear 117 mounted upon a second overrunning clutch member 118 which in turn is mounted upon a rotatably mounted shaft 119. A reversible electric motor 120 is adapted to rotate a shaft 121 and a worm 122 secured on the end of the shaft and meshing with a gear 123 attached to the shaft 119.

The motor 120 is a rapid traverse motor adapted to move the work table vertically or traversely with a rapid motion when desired. As previously described, movement of the handle 112 in a horizontal plane rotates the projections 102 of the overrunning clutches over the tubular member 103 to reverse the direction of operation of the clutches. The mounting of the handle 112 is such that after the direction of the overrunning clutches has been selected, slight upward movement of the handle makes an electrical contact which starts the electric motor 120 in the selected direction.

Figure 4:
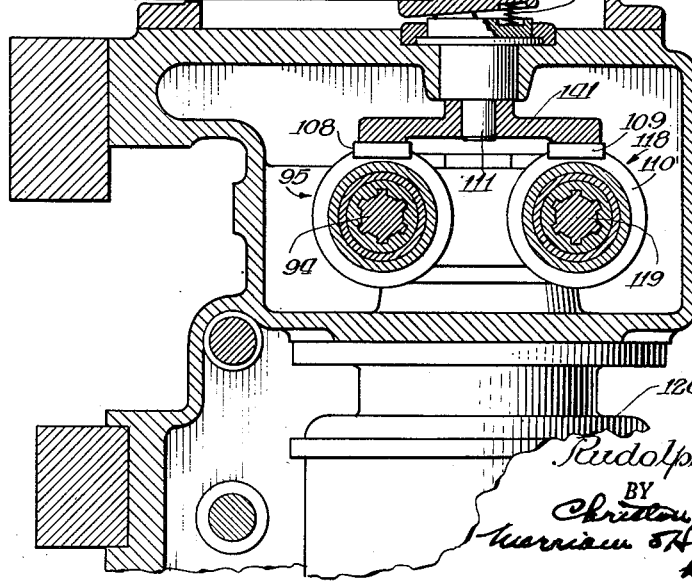
Fig. 4 is a vertical section of the cross rail assembly.

As best seen in Figs. 2 and 4, the handle 112 is connected to a member 124 pivotally mounted to the shaft 111 by means of the pin 138. The handle is permitted horizontal travel in a horizontal slot 132 and, at each end of that slot, is permitted vertical movement in vertical slots 133 and 134. Upward movement of the handle in slot 133 is adapted to cause the handle to actuate a first electrical switch 125 mounted on the interior of the casting 140 and connected in an electrical circuit including a source of current (not shown) and the motor 120, to cause the motor 120 to operate in the desired direction. A second switch 126 positioned above the slot 134 is similarly connected in an electrical circuit and is adapted to be actuated by upward movement of the handle when positioned in slot 134 to cause the motor to operate in the reverse direction. A spring 139 serves to move the handle downwardly in the slots 133 and 134 when the handle is released by the operator.

From the foregoing description, it can be seen that intermittent movement of the work carrying table can be achieved either in horizontal, that is, traverse, or vertical direction in timed relationship with the reciprocation of the ram and upon reciprocation of the ram in either direction. For example, shifting of the overrunning clutches to one operating direction by the handle 112 and clutching gear 113 to the shaft 31 by the handle 116 will cause intermittent horizontal motion of the table upon, for example, the forward or cutting stroke of the ram. If at any time rapid horizontal motion of the table is desired, mere upward pressure on the handle 112 brings into operation the motor 120 to achieve such rapid movement. Similar motions in either direction may be had in the vertical plane by swinging handle 116 to a position clutching the gear 114 to the shaft 30. The feed piston 79 is in constant operation with the operation of the device and continues such operation even though the electrical motor is being used for rapid movement. As soon as the handle 112 is released, breaking the electrical contact, the intermittent feed mechanism immediately takes over and continues to feed in the desired direction.

I claim:

1. In a hydraulic machine tool having a reciprocating cutting member and a work carrying table, means for selectively imparting traverse and vertical feed and rapid motion to the table including, a hydraulic circuit, a piston and cylinder device interposed in said circuit, said piston being adapted to be reciprocated in said cylinder in timed relationship with the reciprocation of said member, a first shaft adapted to be rotated by reciprocation of said piston, a first gear on said shaft, an overrunning clutch interposed between said piston and said gear to intermittently rotate said gear in a selected direction only, a first screw means adapted to cause traverse motion of the table, a second screw means adapted to cause vertical motion of the table, a second gear mounted for free rotation on one of said screws and a third gear mounted for free rotation on the other of said screws, each of said gears being in mesh with another of said gears, clutch means for clutching either said second gear or said third gear to its respective screw, a reversible motor, a second shaft adapted to be rotated by said motor, a second overrunning clutch mounted on said shaft having a fourth gear attached thereto meshing with said first gear, and means for reversing the direction of rotation imparted to said first and fourth gear by said overrunning clutches.

2. In a hydraulic machine tool having a reciprocating cutting member and a work carrying table, means for selectively imparting traverse and vertical feed and rapid motion to the table, including a hydraulic circuit, a piston and cylinder device interposed in said circuit, said piston being adapted to be reciprocated in said cylinder in timed relationship with the reciprocation of said member, a first shaft adapted to be rotated by reciprocation of said piston, a first gear on said shaft, an overrunning clutch interposed between said piston and said gear to intermittently rotate said gear in a chosen direction only, a first screw means adapted to cause traverse motion of the table, a second screw means adapted to cause vertical motion of the table, a second gear mounted for free rotation on one of said screws and a third gear mounted for free rotation on the other of said screws, clutch means for clutching either said second gear or said third gear to its respective screw, a reversible motor, a second shaft adapted to be rotated by said motor, a second overrunning clutch mounted on said shaft having a fourth gear attached thereto meshing with said first gear, means for reversing the direction of rotation imparted to said first and fourth gears by said overrunning clutches, and a manually operable handle movable in a first plane to select the direction of rotation imparted to said first and fourth gears by said overrunning clutches, said handle being movable in a second plane to cause said reversible motor to rotate said second shaft in said selected direction to effect rapid motion of the table.

3. In a hydraulic machine tool having a reciprocating cutting member and a work carrying table, means for selectively imparting traverse and vertical feed motion to the table, including a hydraulic circuit, a piston and cylinder device interposed in said circuit, said piston being adapted to be reciprocated in said cylinder in timed relationship with the reciprocation of said member, a first shaft adapted to be rotated in two directions by reciprocation of said piston, a first gear on said shaft, an overrunning clutch interposed between said piston and said gear to rotate said gear in a selected direction only, said overrunning clutch including a polygonal fitting attached to the shaft, a collar surrounding the fitting and provided with bearing engaging means, a cage, a plurality of bearings in said cage and adapted to wedge against the edges of said polygon to lock the fitting to the collar, whereby rotation of the shaft is adapted to rotate said first gear in one direction, and means for rotating said cage to cause the bearings to wedge against the other edges of the polygon to reverse the direction of rotation of said gear, a first screw means adapted to cause traverse motion of the table, a second screw means adapted to cause vertical motion of the table, a second gear mounted for free rotation on one of said screws and a third gear mounted for free rotation on the other of said screws, each of said gears being in mesh with another of said gears, and clutch means for clutching either said first gear or said second gear to its respective screw.

4. In a hydraulic machine tool having a reciprocating cutting member, a work carrying table and a piston adapted to be reciprocated in timed relationship with reciprocation of the cutting member, means for imparting motion to the table including, a shaft adapted to be rotated in two directions by reciprocation of said piston, an overrunning clutch mounted on said shaft, a gear mounted on said clutch and adapted to be intermittently rotated by the reciprocation of said piston, the direction of said rotation being selectable by operation of said overrunning clutch screw means adapted to move the table traversely and screw means adapted to move the table vertically, clutch means for clutching either of said screw means to the gear, a reversible motor, a second gear in mesh with said first gear, and an overrunning clutch operatively interposed between said motor and said second gear, said motor being adapted to rotate said second gear to cause rapid motion of said table.

5. In a hydraulic machine tool having a reciprocating cutting member, a work carrying table and a piston adapted to be reciprocated in timed relationship with reciprocation of the cutting member, means for imparting motion to the table including, a shaft adapted to be rotated in two directions by reciprocation of said piston, a reversible overrunning clutch mounted on said shaft, a gear mounted on said clutch and adapted to be intermittently rotated by the reciprocation of said piston, the direction of said rotation being selectable by operation of said overrunning clutch screw means adapted to move the table traversely and screw means adapted to move the table vertically, clutch means for clutching either of said screw means to the gear, a reversible motor, a second gear in mesh with said first gear, a reversible overrunning clutch operatively interposed between said motor and said second gear, said motor being adapted to rotate said second gear to cause rapid motion of said table, and a manually actuable handle being adapted to be moved in a first plane to reverse said overrunning clutches to select the direction of motion imparted to said gears thereby, said handle being movable in a second plane to cause said motor to operate in said selected direction.

6. In a hydraulic machine tool having a reciprocating cutting member and a work carrying table, means for imparting rapid motion and feed motion to the table including, a piston and cylinder device adapted to be constantly reciprocated in timed relationship with the reciprocation of the cutting member, gear means including a plurality of intermeshing gears, an overrunning clutch interposed between said piston and cylinder device and said gear means to rotate said gears in a selected direction only in response to reciprocation of said piston, a screw means adapted to cause traverse motion of the table, and a second screw means adapted to cause vertical motion of the table, clutch means for clutching said gear means to either of said screw means to selectively transmit rotation of the gear means into traverse or vertical motion of the table, and a motor adapted to drive said gear means to cause rapid motion of the table.

7. In a hydraulic machine tool having a reciprocating cutting member and a work carrying table, means for selectively imparting to the table a feed motion or a rapid motion, comprising, a reciprocal drive operating in timed relation with said reciprocating cutting member, an independent rapid motion drive, gear means actuatable by either of said drives to move the table, a selectively operable unidirectional drive means constantly connecting the reciprocal drive to the gear means and shiftable to a first condition imparting rotation in one direction to the gear means and during only one phase of the reciprocating cycle of the reciprocal drive and shiftable to a second condition imparting rotation in the other direction to the gear means and during only the other phase of said reciprocating cycle, means for shifting the unidirectional drive means, and clutch means for clutching the rapid motion drive to the gear means whereby said rapid motion drive may actuate said gear means during any part of either reciprocating cycle of said reciprocal drive.

8. In a hydraulic machine tool having a reciprocating cutting member and a work carrying table, means for selectively imparting to the table a feed motion or a rapid motion, comprising, a reciprocal drive operating in timed relation with said reciprocating cutting member, an independent rapid motion drive, gear means actuatable by either of said drives to move the table, and overrunning clutch means adapted to permit said reciprocal drive to actuate said gear means during only one phase of its reciprocating cycle and to permit said rapid motion drive to actuate said gear means during any part of said cycle.

RUDOLPH E. HERRSTRUM.

REFERENCES CITED

The following references are of record in the file of this patent:

UNITED STATES PATENTS

| Number | Name | Date |
|---|---|---|
| 1,960,566 | Zimmermann | May 29, 1934 |
| 2,068,773 | Slider | Jan. 26, 1937 |
| 2,223,038 | Jackson | Nov. 26, 1940 |
| 2,262,330 | McNeil et al. | Nov. 11, 1941 |

FOREIGN PATENTS

| Number | Country | Date |
|---|---|---|
| 465,809 | Great Britain | May 14, 1931 |